United States Patent [19]

Wydra et al.

[11] 3,857,717

[45] Dec. 31, 1974

[54] CHEMICAL RESISTANT, TEMPERATURE RESISTANT LACQUER-LIKE INORGANIC COATING COMPOSITION

[75] Inventors: Gerhard Wydra, Dachau; Franz Puchinger, Munich, both of Germany

[73] Assignee: Motoren-und Turbinen-Union Munich GmbH, Munich, Germany

[22] Filed: Aug. 11, 1972

[21] Appl. No.: 279,764

[30] Foreign Application Priority Data
Aug. 11, 1971  Germany............................ 2140208

[52] U.S. Cl............... 106/286, 117/123 A, 117/127, 117/169 R
[51] Int. Cl....... C04b 41/06, C09d 1/00, C23f 7/00
[58] Field of Search......... 106/286; 117/127, 169 R, 117/123 A

[56] References Cited
UNITED STATES PATENTS

| | | | |
|---|---|---|---|
| 3,248,251 | 4/1966 | Allen | 106/286 |
| 3,300,331 | 1/1967 | Collins | 106/286 |
| 3,352,814 | 11/1967 | Collins et al. | 106/286 |

*Primary Examiner*—Allan Lieberman
*Attorney, Agent, or Firm*—Craig & Antonelli

[57]  ABSTRACT

A chemical resistant, temperature resistant, inorganic lacquer-like coating composition containing a binding agent and a finely divided filler material. The filler material is temperature resistant and chemical resistant, has a very small linear expansion coefficient and is homogeneously distributed within the binding agent. The binding agent is made of an admixture of aqueous chromic acid solution and a phosphoric acid or salts thereof.

8 Claims, No Drawings

CHEMICAL RESISTANT, TEMPERATURE RESISTANT LACQUER-LIKE INORGANIC COATING COMPOSITION

The present invention relates to a chemical resistant (durable), temperature resistant inorganic lacquer-like coating composition containing a binding agent and a finely divided or powdered filler material, wherein the filler material which is a temperature and chemical resistant filler material having a very small linear coefficient of thermal expansion is homogeneously distributed in the binding agent. The proportion of filler material in the coating is preferably from about 30 to about 70% by weight based on the total weight of the coating composition. Consequently, the balance of the composition, i.e., from about 70 to about 30% by weight is the binding agent.

The aim of the present invention is to provide an inorganic coating that is manufactured in a simple manner which exhibits high temperature resistance and high chemical resistance, and possesses a small thermal expansion coefficient as well as a high compressive strength. Furthermore, the coating composition of the invention should adhere well under frequently occurring alternating temperature variations, and should not enter into physical or chemical combination or bonding with other materials.

The present invention is particularly characterized in that the binding agent used as a starting material consists essentially of an aqueous chromic acid solution (containing about 20 to about 30% by weight of chromic acid) to which is added a phosphoric acid (especially phosphorous acid) or the salts thereof in amounts of from about 10 to 30% by weight and preferably 10% by weight.

Suitable salts of a phosphoric acid include alkali metal, alkaline earth metal and the like.

An excess of chromic acid is thereby used. A considerable advantage of the present invention resides in the reduction of the reactants and a simple manufacture of the binding agent as the starting material is possible without hydroxide production. In case of larger starting quantities of the reactants, the resulting reaction heat has to be conducted off by appropriate cooling.

Finely ground quartz or other temperature resistant pigments such as zirconium oxide, serve as filler material. The particle size of the filler material usually is from 5 to 20 microns. The linear thermal expansion coefficient of the filler material is on the order of from 8 to $50 \times 10^{-8}$.

If the coating according to the present invention is applied to a base material or substrate for example by means of a paint spray gun, then at first a slight proportion of water escapes by evaporation. The remaining evaporation of the water out of the coating composition is effected by a heating up to about 80°C. to about 90°C. during about half an hour. In this manner any bubble formation is avoided. After this heat treatment, baking for about half an hour at a temperature of about 250° to 350°C. can take place.

Since the layer thus obtained exhibits, in addition to good corrosion resistance, a temperature resistance at about 900°C. a good adherence on metallic and ceramic base materials, a slight coefficient of thermal expansion and a very high compressive strength, the coating composition of the present invention finds application, for example, as separating compound or material for lining of lead casting molds. Since the coating can be used as often as desired by reason of its practically unlimited length of life, the coating composition has to be applied to the mold and baked in only once.

The invention will be further understood from the following examples:

EXAMPLE 1

In this example 9.3 parts by weight of an aqueous chromic acid solution containing 65% by weight of chromic acid is admixed with 2.3 parts by weight of phosphoric acid to provide a binding agent. Then 10 parts by weight of the binding agent and 10 parts by weight of finely divided quartz (particle size of 20 microns) are mixed in a blender apparatus.

The resulting coating composition is applied by a spray gun to a stainless steel substrate to a layer thickness of 0.1 mm. The coating is first heated at 50°C. for about one-half hour to remove the water and then baked at 270°C. for one-half hour. The final inorganic coating shows excellent resistance to acids and salt solutions and adhered to the metal substrate even after repeated heating to 500°C. and cooling to room temperature.

EXAMPLE 2

By following the procedures of Example 1, additional coating compositions are prepared from the following compositions of binding agent (aqueous chromic acid and phosphoric acid or salt thereof) and a filler.

Table 1

| Comp. | Binding Agent Compositions | |
|---|---|---|
| | Chromic Acid Component | Phosphoric Acid Component |
| A | 20% chromic acid solution 100 parts by weight | 100% phosphorous acid ($H_3PO_3$) crystals 10 parts by weight |
| B | 25% chromic acid solution 100 parts by weight | Magnesium phosphate 25 parts by weight |
| C | 30% chromic acid solution 100 parts by weight | Sodium phosphate dibasic 20 parts by weight |

TABLE 2

| Coating Compositions | |
|---|---|
| Binding Agent | Filler |
| A | Zirconium oxide |
| B | Iron oxide |
| C | Kaolin |

The above coating compositions are then applied to a casting mold and are subsequently heated and baked in the manner described in Example 1.

Each of the above coating compositions containing binding agents A, B, and C, respectively, is evaluated for chemical resistance and temperature resistance as a coating layer 0.1 mm. thick on the inside of the casting mold. Thereafter, several lead castings, i.e., more than 100 were produced in the mold and were easily removed without causing deterioration of the layer of the coating composition.

While the novel principles of the invention have been described, it will be understood that various omissions, modifications and changes in these principles may be made by one skilled in the art without departing from the spirit and scope of the invention.

What is claimed is:

1. A chemical resistant, temperature resistant, inorganic lacquer-like coating composition which comprises a binding agent and a finely divided powdered filler material selected from the group consisting of finely ground quartz, zirconium oxide, kaolin and iron oxide and having a particle size of from about 5 to 20 microns, said filler material being homogeneously distributed within the binding agent, the proportion of filler material in the coating composition being from about 30 to about 70% by weight of the total weight of the composition and the balance comprising the binding agent, and said binding agent consisting essentially of an aqueous chromic acid solution containing from about 20 to 30% by weight of chromic acid admixed with about 10 to 30% by weight of phosphorous acid.

2. The coating composition of claim 1, wherein the binding agent contains about 10% by weight of phosphorous acid.

3. The coating composition of claim 1 wherein the linear thermal expansion coefficient of said filler material is on the order of from 8 to $50 \times 10^{-8}$.

4. A coated ceramic or metallic substrate having an inorganic coating baked thereon, said coating prior to baking comprising a binding agent and a finely divided powdered filler material selected from the group consisting of finely ground quartz, zirconium oxide, iron oxide and kaolin and having a particle size of from about 5 to 20 microns, said filler material being homogeneously distributed within the binding agent, the proportion of filler material in the coating composition being from about 30 to about 70% by weight of the total weight of the coating and the balance comprising the binding agent prior to baking, and said binding agent consisting essentially of an aqueous chromic acid solution containing from about 20 to about 30% by weight of chromic acid admixed with about 10 to about 30% by weight of phosphorous acid.

5. The coated substrate of claim 4, wherein the binding agent contains about 10% by weight of phosphorous acid.

6. The coated substrate of claim 4, wherein the linear thermal expansion coefficient of said filler material is on the order of from 8 to $50 \times 10^{-8}$.

7. A process for forming a chemical resistant and temperature resistant coating on a ceramic or metallic substrate which comprises applying a coating composition comprising a binding agent and a finely divided filler material selected from the group consisting of finely ground quartz, zirconium oxide, kaolin and iron oxide and having a particle size of from about 5 to 20 microns, said filler material being homogeneously distributed within the binding agent, the proportion of filler material in the coating composition being from about 30 to about 70% by weight of the total weight of said composition and the balance comprising the binding agent and said binding agent consisting essentially of an aqueous chromic acid solution containing from about 20 to about 30% by weight of chromic acid admixed with about 10 to about 30% by weight of phosphorous acid; heating the applied coating composition to a temperature sufficient to remove water therefrom and thereafter baking at higher temperature to set up the binding agent.

8. The process of claim 7, wherein the coating composition is initially heated to about 80°C. to about 90°C. and then baked at from about 250°C. to 350°C.

* * * * *